United States Patent [19]

Hubbard et al.

[11] Patent Number: 4,662,160
[45] Date of Patent: May 5, 1987

[54] COTTON BASKET UNLOADING STRUCTURE

[75] Inventors: Bruce L. Hubbard; Kenneth C. McConnell, both of Ankeny; Robert E. Fox, Minburn, all of Iowa

[73] Assignee: Deere & Company, Moline, Ill.

[21] Appl. No.: 781,434

[22] Filed: Sep. 26, 1985

[51] Int. Cl.$^4$ ............... A01D 46/08; B60P 1/34
[52] U.S. Cl. ............................... 56/16.6; 56/28; 298/18; 298/11; 414/497; 414/346
[58] Field of Search ............ 56/16.6, 28, 202, 203; 298/11, 18, 10; 414/497, 346

[56] References Cited

U.S. PATENT DOCUMENTS 2,862,342 12/1958 Fergason ..................... 56/16.6
4,255,919 3/1981 Copley et al. ................ 56/16.6
4,430,038 2/1984 Rempel et al. ............... 298/18

FOREIGN PATENT DOCUMENTS 704511 12/1979 U.S.S.R. .................... 56/16.6

Primary Examiner—Gene Mancene
Assistant Examiner—John G. Weiss

[57] ABSTRACT

A conveyor is mounted on the slope side of a cotton basket. Lift structure pivots the basket until the slope side of the basket angles slightly downwardly toward the trailer or module builder which receives the cotton. The conveyor moves the cotton from the basket, and a metering bar positioned above and inwardly from the dump end of the conveyor when the basket is in the dump position is rotated with the conveyor drive to assure a smooth continuous flow of cotton without bunching or stalling on the conveyor.

19 Claims, 4 Drawing Figures

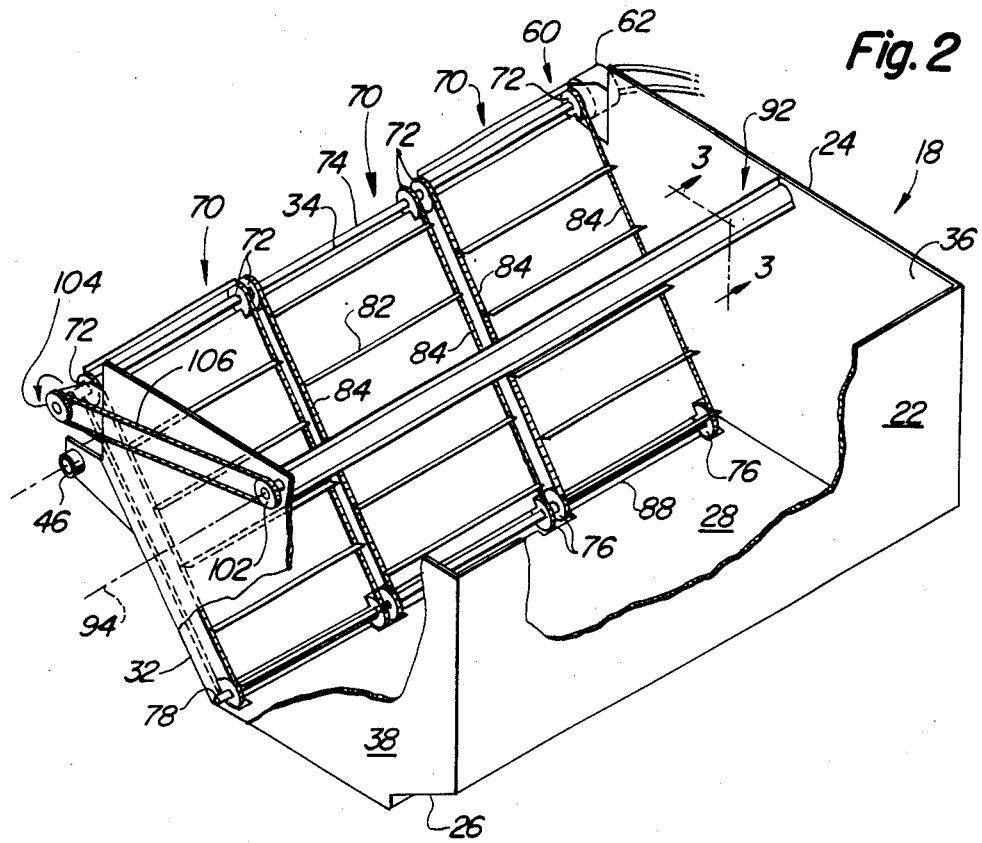
*Fig. 2*
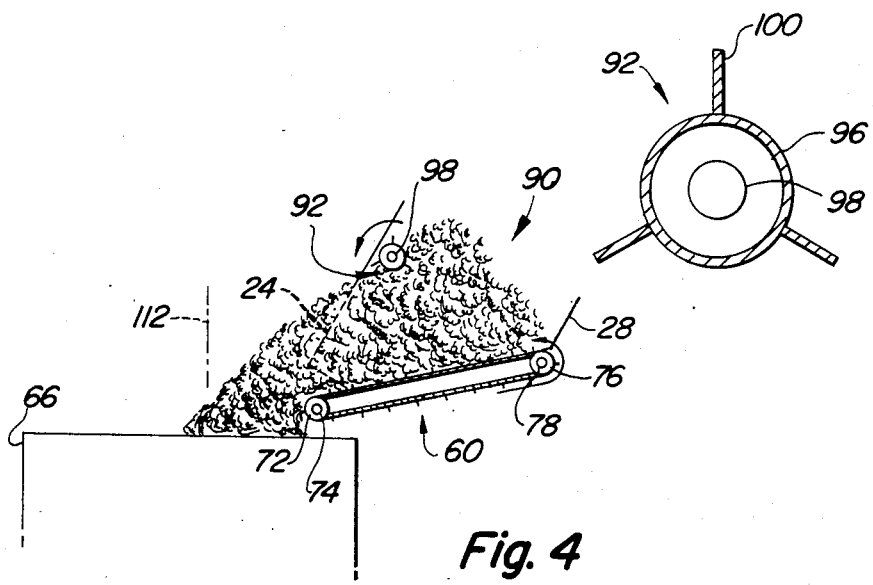
*Fig. 3*
*Fig. 4*

COTTON BASKET UNLOADING STRUCTURE

BACKGROUND OF THE INVENTION

The present invention relates generally to cotton harvesters and more specifically to structures for dumping cotton from the basket on such a harvester.

A cotton basket on a cotton harvester typically is pivotally mounted to the harvester frame for rocking up to 90 degrees about a fore-and-aft extending axis on the dump side of the machine. The structure permits a quick and complete emptying of the basket, but also presents several problems. Dumping partial loads such as when topping off a module builder is difficult since there is little control of the amount of cotton coming out of the basket. Often the operator and trailer crew are forced to complete basket unloading by hand or pick cotton up from the ground which has spilled over the receptacle during dumping. Some baskets incorporate a vane or fork structure to hold partial loads of cotton during dumping and although such structure has helped dump control considerably, a relatively heavy load must be maintained in the basket at the full dump position. Liftable baskets with a lower conveyor are available, but these types of baskets often tend to be slower in unloading and although there is better control of dumping, large blobs of cotton often emerge from the side opening of the basket and swell out over the dump side of the conveyor resulting in ground spillage or less than optimum trailer or module filling. Also, the basket must be lifted above the trailer or module builder, and the lifting structure to accomplish this tends to be bulky and expensive. Some conveyor systems have difficulty moving cotton when loaded heavily near the output end of the conveyor.

OBJECTS OF THE INVENTION

It is therefore an object of the invention to provide an improved basket unloading structure for a cotton harvester.

It is a further object of the invention to provide cotton harvester basket unloading structure having improved stability and a fast dumping time. It is another object to provide such a structure having good dump side clearance for a trailer, module builder or similar implement.

It is yet another object of the invention to provide a cotton harvester basket unloading structure having improved dump control. It is a further object to provide such a structure which is less bulky and more stable than at least some of the previously available unloading systems.

It is a further object of the invention to provide an improved cotton basket unloading structure with a discharge conveyor. It is yet another object to provide such a structure which eliminates load stalling on the conveyor and uncontrolled blobs of cotton falling over the output end of the conveyor. It is still another object to provide such a structure with a metering member which also helps to hold cotton in the basket as the basket is moved to a dump position.

BRIEF DESCRIPTION OF THE INVENTION

In accordance with the above objects, the sloped dump sidewall of a cotton basket is provided with a chain conveyor which extends upwardly along the wall and outwardly to a dump side end located slightly beyond the top edge of the basket. Hydraulic cylinders rock the basket approximately 60 degrees about a fore-and-aft extending axis from the field position to a dump position wherein the sloped wall and conveyor are angled slightly downwardly toward the trailer or module builder. Conventional linkages are provided to lift the basket lid as the basket rocks to the dump position. A hydraulic motor drives the conveyor to move the cotton from the basket. To eliminate erratic cotton flow and prevent cotton from stalling on the conveyor, a metering bar is provided near the central top portion of the basket below the lid. The metering bar extends fore-and-aft in the basket above the conveyor and as the basket is raised, the bar helps to hold the cotton in the basket. When the basket is in the dump position, the bar is located substantially inwardly of the dump end of the conveyor below the uppermost portion of the compacted mass of cotton. The metering bar is driven with the conveyor by a chain drive and assures a smooth, even flow of cotton from the compacted mass. The conveyed cotton is limited in height by the rotating metering bar which prevents blobs of cotton from swelling up and falling uncontrolled off of the end of the conveyor. The conveyor reduces the angle through which the basket must pivot by as much as 30 degrees or more compared to conventional dumping structeus to increase stability; fast, reliable dumping is still maintained by angling the slope side of the basket slightly downwardly from the horizontal toward the receiving receptacle. By moving the cotton relative to a sidewall of the basket rather than the bottom and by rotating the metering bar in the mass of cotton adjacent the top edge of the basket, an improved and more controllable flow of cotton is achieved so that the trailer or module builder can be optimally loaded with significantly reduced ground spillage.

These and other objects, features and advantages of the present invention will become apparent from the detailed description which follows when taken with the accompanying drawings.

BRIEF DESCRIPTION OF THE DRAWINGS

FIG. 2 is a rear prospective view of the basket on the harvester of FIG. 1, partially broken away to better show the details of the conveyor and metering member.

FIG. 3 is a view of the metering member taken essentially along lines 3—3 of FIG. 2.

FIG. 4 is a schematic representation of the operation of the unloading structure of the present invention when the basket is in the dump position.

DESCRIPTION OF THE PREFERRED EMBODIMENT

Figure 1:
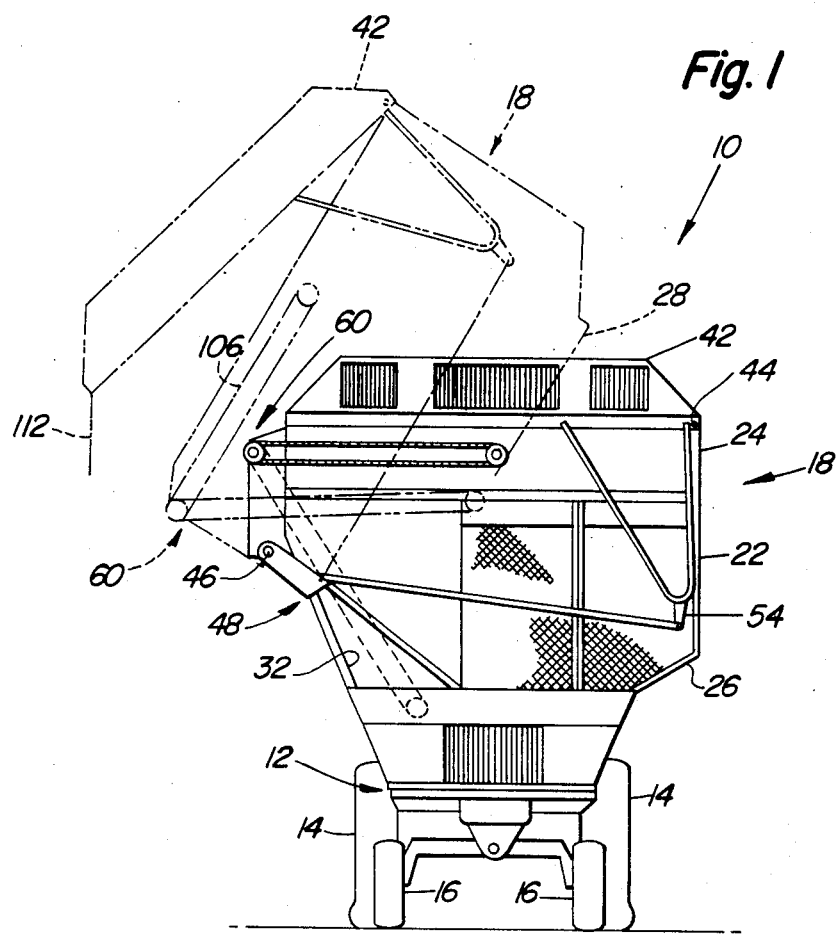
FIG. 1 is a rear view of a cotton harvester with the basket unloading structure of the present invention.

Referring now to FIG. 1, therein is shown a cotton harvester indicated generally at 10 having a main frame 12 supported for forward movement over the ground by forward drive wheels 14 and rear steerable wheels 16. A cotton basket 18 is supported on the main frame 12. With the exception of the basket 18, the cotton harvester 10 is of conventional construction and includes forwardly mounted row harvesting units (not shown) for removing cotton from rows of cotton plants and an air system (not shown) for directing cotton rearwardly and upwardly into the upper portion of the basket 18, such as appear on the commercially available John Deere model 9940 four-row cotton picker.

The basket 18 includes an upright sidewall 22 extending downwardly from a top portion or extension 24 to a sloped connecting wall 26 which extends inwardly and downwardly to a basket bottom indicated generally at 28. The basket bottom 28 extends generally horizontally to an upwardly and outwardly sloped, dump side sidewall 32 which, as shown, extends upwardly from the horizontal at an angle of approximately 53 degrees and terminates at a top edge 34 (FIG. 2) slightly below the level of the top portion 24 of the basket 18. End walls 36 and 38 extend between the sidewalls 22 and 32 generally closing the forward and aft ends, respectively, of the basket 18. A dome-shaped basket lid 42 is pivotally connected adjacent the top portion 24 of the upright sidewall 22 for rocking about a fore-and-aft extending pivotal axis 44.

The basket 18 is connected for rocking with respect to the frame 12 by a fore-and-aft extending pivot 46 supported from the dump side (the left side as viewed in FIG. 1) of the harvester 10 by conventional mast structure 48 extending upwardly and outwardly from the forward and aft ends of the frame 12. A pair of conventional hydraulic cylinders (not shown) located at each end of the basket 18 rocks the basket about the pivot 46 between a field position (solid lines of FIG. 1) and a dump position (broken lines of FIG. 1). Lid control linkage structure 54 connected between the upper portion of the mast structure 48 and the pivot side of the basket lid 42 moves the lid 42 between a closed position (solid lines of FIG. 1) when the basket is in the field position, and an open position (dotted lines) when the basket is in the dump position. The above described structure for pivoting the basket 18 and the basket lid 42 is generally of conventional construction of the type on the commercially available John Deere model 9940 cotton picker and so will not be described in further detail here. However, it should be noted that the fore-and-aft extending pivot 46 is located outwardly and above a corresponding pivot on a conventional machine, and the amount of rocking of the basket 18 about the pivot 46 is substantially reduced as compared with the conventional machine.

A conveyor 60 is mounted on the dump side sidewall 32 and is supported closely adjacent thereto between the basket bottom 28 and the top edge 34. The conveyor 60 is driven by a hydraulic motor 62 to move cotton from the basket to a trailer or module builder 66 (FIG. 4) when the basket 18 is in the dump position. In the preferred embodiment as shown in FIG. 2, the conveyor 60 is comprised of three individual slatted chain conveyors 70 mounted end-to-end along the length of the sidewall 32 and driven by sprockets 72 mounted on a common drive shaft 74 operably connected to the hydraulic motor 62. The innermost ends of the slatted chain conveyors 70 are mounted on sprockets 76 carried on a shaft 78 extending between the sidewalls 36 and 38. The conveyors 70 include slats 82 mounted on chains 84 and driven by the sprockets 72. The slats 82 ride closely adjacent the inside surface of the dump side sidewall 32. The sidewall 32 is slotted at locations 88 adjacent the bottom 28, and the conveyors 70 extend around the outer surface of the sidewall 32 passing through the slotted locations 88.

To uniformly convey cotton from the mass of cotton indicated generally at 90 in FIG. 4, a metering member 92 is rotatably mounted between the sidewalls 36 and 38 adjacent the top portion 24 of the basket 18 for rotation about a fore-and-aft extending axis 94 located between the sidewalls 22 and 32, more closely adjacent the dump side sidewall 32. The metering member 92 includes a cylindrical portion 96 connected to a dirve shaft 98, and a plurality of elongated slats 100 spaced around, and extending the length of, the metering member 92. In the preferred embodiment, three slats 100 are equally spaced around the cylindrical portion 96. The aft end of the drive shaft 98 extends through the wall 38 and is connected to a driven sprocket 102. A drive sprocket 104 is connected to the aft end of the drive shaft 74 for the conveyor 60, and a chain 106 is trained around the sprockets 104 and 102 to drive the metering member 92 with the conveyor 60.

As shown, the chain 106 drives the metering member 92 in the same direction (counterclockwise as seen in FIGS. 1–4) to simplify the drive mechanism. However, it is also possible to rotate the metering member 92 in the opposite direction by simply providing a conventional reversing mechanism such as reversing sprockets or a looped drive chain or belt 106.

Since the end of the conveyor 60 is located a substantial distance above the pivotal axis 46 when the basket is in the field position shown by the solid lines of FIG. 1, when the basket is rotated approximately 60 degrees about the pivotal axis 46 to the dump position, the end of the conveyor extends outwardly a substantial distance from the dump-side of the cotton harvester 10 for easier positioning of the harvester next to, and improved dumping into the module builder or trailer 66. In the dump position as shown in FIG. 4, the metering member 92 is offset above the conveyor 60 and inwardly a substantial distance from the end of the conveyor 60. As the hydraulic motor 62 is powered to drive the individual slatted chain conveyors 70, the height of the cotton conveyed outwardly by the conveyor 60 is limited to generally the height of the member 92 above the conveyor. The member 92 uniformly meters out cotton and prevents large blobs of cotton from swelling out and falling uncontrolled over the end of the conveyor and onto the ground. The cotton in the basket 18 is conveyed outwardly above the sidewall 32 as the metering member 92 rotates in the cotton that was generally located near the top of the basket 18 when the basket was in the field position.

To aid in reducing cotton spillage, rubber flaps 112 are added to the outer edge of the basket lid 42 on the dump-side of the basket. The flaps 112 extend downwardly from the lid 42 to a position generally outwardly of the end of the conveyor 60 and help prevent cotton from moving outwardly beyond the outer edge of the module builder or trailer 66.

Having described the preferred embodiment, it will be apparent that modifications can be made without departing from the scope of the invention as defined in the accompanying claims.

We claim:

1. In a cotton harvester including a cotton basket for receiving harvested cotton therein, said basket including a bottom and a top and upright sidewalls, unloading structure for dumping the cotton from the basket towards one side of the harvester, said structure comprising:

a conveyor supported adjacent the dump side sidewall;

means for pivoting the basket about a generally horizontal axis between a field position wherein the dump side sidewall extends upwardly from the bottom of the basket, and a dump position wherein the dump side sidewall is substantially horizontal or angled slightly downwardly toward the ground; means driving the conveyor when the basket is in the dump position for moving cotton out of the basket; and a metering member rotatably mounted in the basket above the bottom and between the sidewalls, and means for rotating the metering member as the conveyor is driven for metering cotton uniformly between said member and the conveyor.

2. The invention as set forth in claim 1 wherein the metering member extends substantially the entire length of the basket inwardly of the dump side sidewall and parallel to the pivotal axis of the basket, wherein, in the dump position of the basket, the metering member is located substantially inwardly from the end of the conveyor.

3. The invention as set forth in claim 2 wherein the metering member is supported adjacent the top of the basket.

4. The invention as set forth in claim 2 wherein the metering member is located closer to the dump side sidewall than to the opposite sidewall.

5. The invention as set forth in claim 1 wherein the conveyor includes an outermost end which, when the basket is in the field position, is located outwardly and above the pivotal axis of the basket, said dump side sidewall slopes inwardly and downwardly toward the bottom of the basket, and said conveyor extends inwardly and downwardly from the outermost end along the sidewall terminating adjacent the bottom of the basket.

6. The invention as set forth in claim 5 wherein the outermost end of the convey is located a substantial distance above the pivot, when the basket is in the field position, said outermost end movable a substantial distance outwardly from the dump side of the basket upon pivoting of the basket to the dump position.

7. The invention as set forth in claim 5 the basket has range of pivoting equal to about 60 degrees.

8. The invention as set forth in claim 1 wherein in the dump position, the dump side sidewall is angled downwardly at an angle of about 7 degrees.

9. In a dumpable cotton basket for a framed cotton harvester, said basket including a bottom, a dump-side sidewall, an opposite sidewall and end walls, pivot means extending generally parallel to the dump-side sidewall and connecting the basket to the harvester frame for rocking about a pivotal axis between a field position wherein the dump-side sidewall extends upwardly from the bottom and a dump position wherein the dump-side sidewall extends approximately horizontally, a conveyor having an upper conveying portion extending closely adjacent the dump-side sidewall on the inside of the basket, means for rocking the basket between the field and dump positions, means driving the conveyor to move cotton out from the basket when the basket is in the dump position, metering means rotatably mounted above the conveyor, inwardly of the outer end of the conveyor, when the basket is in the dump position, and means rotating the member as the conveyor is driven for providing an even flow of cotton of uniform height from the basket.

10. The invention as set forth in claim 9 wherein the pivotal axis is located below the outer end of the conveyor a substantial distance when the basket is in the field position, and wherein said means for rocking pivots the basket through an angle of less than 90 degrees but greater than 45 degrees so that the outer end of the conveyor is located a substantial distance outwardly of the pivot when the basket is in the dump position.

11. The invention as set forth in claim 10 wherein the dump-side sidewall extends downwardly in the dumping direction at an angle of between 5 and 10 degrees when the basket is in the dump position.

12. In a cotton harvester having a frame and a cotton basket having a bottom, a top portion, and sidewalls for containing a mass of cotton, said basket movable between a field position for filling of the basket and a dump position for unloading of the basket, operable conveyor means located at least partly within the basket for moving cotton outwardly from the harvester from the lower portion of the mass of cotton when the basket is in the dump position, metering means including a rotatable metering member located above the conveyor and offset from the top portion, and means for rotating the metering member in the mass of cotton during operation of the conveyor to uniformly meter a constant height of cotton from the basket.

13. The invention as set forth in claim 12 wherein the metering member extends substantially the width of the conveyor and when the basket is in the dump position the metering member is located inwardly of the outermost end of the conveyor.

14. The invention as set forth in claim 12 wherein the means for rotating includes drive means connecting the conveyor and the rotating member for operation together.

15. The invention as set forth in claim 12 wherein the means for moving the basket includes means for pivoting the basket about an axis located below the outer end of the conveyor when the basket is in the field position.

16. The invention as set forth in claim 15 wherein the conveyor is located adjacent one of the sidewalls and wherein said one of the sidewalls is upright when the basket is in the field position and generally horizontal when the basket is in the dump position.

17. The invention as set forth in claim 16 wherein when the basket is in the dump position, the sidewall adjacent the conveyor is angled downwardly toward the ground in the conveying direction.

18. In a cotton harvester having a frame and a cotton basket having sidewalls for containing a mass of cotton, said basket movable between a field position for filling of the basket and a dump position for unloading of the basket, operable conveyor means located at least partly within the basket for moving cotton outwardly from the harvester from the lower portion of the mass of cotton when the basket is in the dump position, metering means located above the conveyor for movement in the mass of cotton during operation of the conveyor to uniformly meter a constant height of cotton from the basket, and drive means connecting the conveyor and the metering means for operation together.

19. The invention as set forth in claim 18 wherein the metering means comprises a rotating member extending substantially the width of the conveyor.

* * * * *